(12) United States Patent
Al Ahmari et al.

(10) Patent No.: US 11,708,753 B2
(45) Date of Patent: Jul. 25, 2023

(54) DOWNHOLE CERAMIC DISK DISSOLVING IN ACID AND WELL STIMULATION IN SINGLE DOWNHOLE ACTIVITY

(71) Applicant: Saudi Arabian Oil Company, Dhahran (SA)

(72) Inventors: Abdulrahman Al Ahmari, Qatif (SA); Mohammed Al Dabbous, Qatif (SA)

(73) Assignee: SAUDI ARABIAN OIL COMPANY

( * ) Notice: Subject to any disclaimer, the term of this patent is extended or adjusted under 35 U.S.C. 154(b) by 80 days.

(21) Appl. No.: 17/363,376

(22) Filed: Jun. 30, 2021

(65) Prior Publication Data
US 2023/0003112 A1    Jan. 5, 2023

(51) Int. Cl.
*E21B 43/27*    (2006.01)
*C09K 8/72*    (2006.01)

(52) U.S. Cl.
CPC .............. *E21B 43/27* (2020.05); *C09K 8/72* (2013.01); *E21B 2200/08* (2020.05)

(58) Field of Classification Search
None
See application file for complete search history.

(56) References Cited

U.S. PATENT DOCUMENTS

| | | | |
|---|---|---|---|
| 2,329,157 A * | 9/1943 | Frack | E21B 37/00 137/67 |
| 4,605,074 A * | 8/1986 | Barfield | E21B 43/1195 166/317 |
| 5,327,973 A * | 7/1994 | Jennings, Jr. | E21B 43/162 166/305.1 |
| 5,924,696 A | 7/1999 | Frazier | |
| 6,323,307 B1 | 11/2001 | Bigg et al. | |
| 7,661,480 B2 | 2/2010 | Al-Anazi | |
| 9,139,928 B2 | 9/2015 | Mazyar et al. | |
| 9,194,209 B2 | 11/2015 | Frazier | |
| 10,119,359 B2 | 11/2018 | Frazier | |
| 10,337,379 B2 | 7/2019 | Dimpelfeld et al. | |
| 10,465,468 B2 | 11/2019 | Frazier et al. | |
| 2009/0065216 A1 | 3/2009 | Frazier | |
| 2014/0116699 A1 * | 5/2014 | Helms | E21B 33/127 166/387 |
| 2016/0177661 A1 * | 6/2016 | Xu | C22C 49/14 166/292 |

FOREIGN PATENT DOCUMENTS

RU    2739180    * 12/2020 ............ C04B 35/20

* cited by examiner

*Primary Examiner* — Anuradha Ahuja
(74) *Attorney, Agent, or Firm* — Bracewell LLP; Constance Gall Rhebergen

(57) ABSTRACT

Methods and systems for breaching a ceramic disk installed in a wellbore during oil and gas well completion and production activities. A ceramic disk dissolves with a strong acid. Additionally, the strong acid is further used to stimulate a reservoir. The strong acid can be introduced to the wellbore through coiled tubing or directly from the surface.

9 Claims, 2 Drawing Sheets

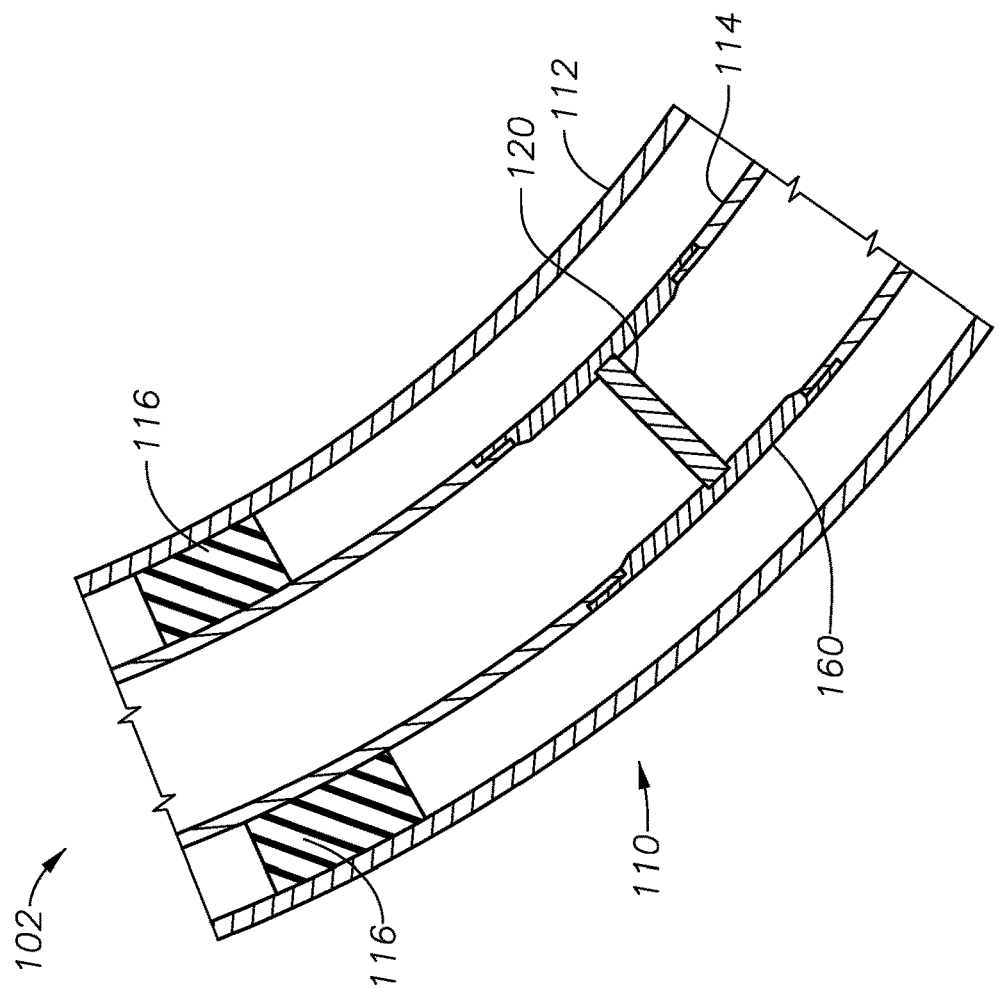
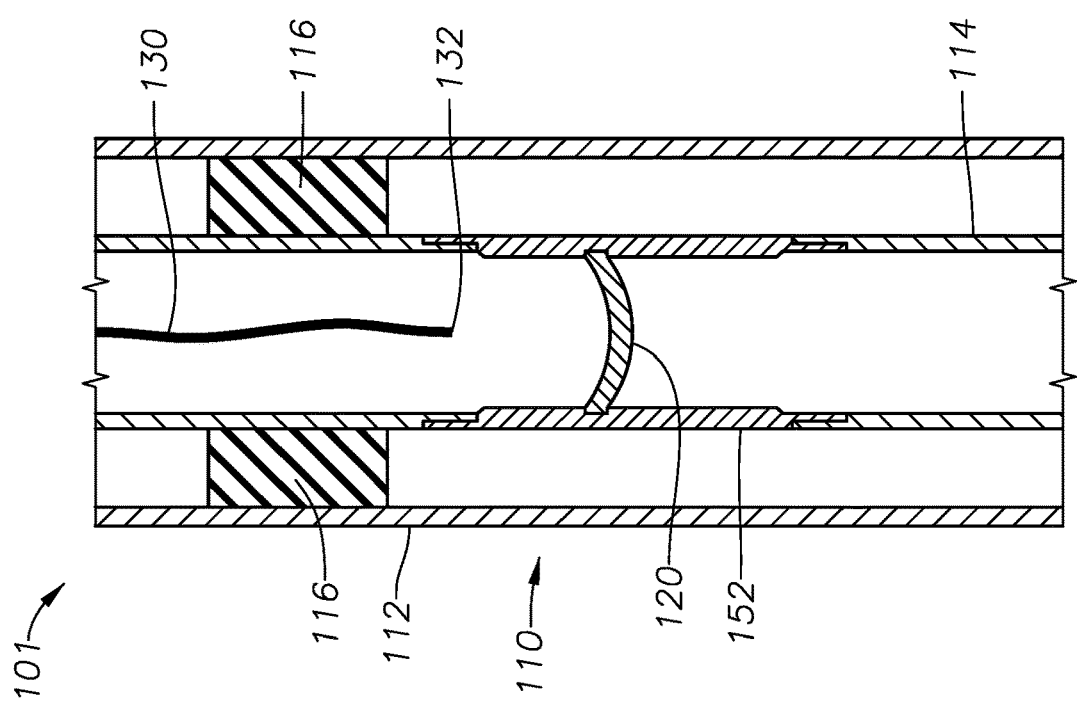
FIG. 1B
FIG. 1A

DOWNHOLE CERAMIC DISK DISSOLVING IN ACID AND WELL STIMULATION IN SINGLE DOWNHOLE ACTIVITY

FIELD

This disclosure relates to systems and methods for downhole tool removal. More specifically, this disclosure relates to removing functionality of a ceramic disk installed in a wellbore utilizing strong acids, and stimulating reservoirs.

BACKGROUND

During hydrocarbon well drilling and completion activities, production casing and production tubing is installed in a wellbore. Prior to production packer installation, ceramic disks are installed in the wellbore to maintain pressure and isolate the production tubing for wellbore operations. Once production packers are installed in the production casing, the ceramic disk is broken so that well flowback operations can begin.

Ceramic disks are generally ruptured with milling tools directed downhole with coiled tubing. Milling tools are drill-like tools that mechanically destroy the disk. Other ways of rupturing the ceramic disks include dropping go-devils or other tools in the wellbore. The conventional methods of milling or dropping tools results in the use of heavy equipment, takes substantial time and energy, and results in debris formation in the wellbore. The conventional methods of milling or dropping tools can also result in complications related to coil tubing getting locked-up (or stuck) within a wellbore, or breakage of heavy equipment. Additionally, it can take substantial time and energy to lower tools downhole, and other downhole operations may not be able to be performed downhole when the milling is being performed, or when the milling or other tools are lowered downhole.

Occasionally, wells require preliminary or additional stimulation to increase production of hydrocarbons from the well. Wells drilled in certain types of formations are prone to high skin reservoir factors. A high skin reservoir factor can result in a reduced production or flow from the well.

Due to the long tool transit time downhole and due to the risk of damage or lock-up from lowering and raising downhole tools through the wellbore, performing more than one task with the same tools, methods, or during a single tool run is advantageous. Therefore, additional methods of rupturing ceramic disks and performing well stimulation downhole are desired, including methods performing multiple tasks with the same method or system.

SUMMARY

The disclosure relates to systems and methods for removing the functionality of a ceramic disk installed in a wellbore during oil and gas well completion and production activities. The ceramic disks are installed in a wellbore during wellbore operations. The wellbore operations can include packer installation, wellbore isolation sub installation, logging operations, or other well completion or production activities. The ceramic disks can be installed in wellbore nipples, landing nipples, sealing sections of wellbore production piping, wellbore subs, or other sections of the production piping or casing of the wellbore, including screwing a threaded disk directly into producing piping or casing.

More specifically, the disclosure relates to breaching a ceramic disk with a strong acid until structural failure. Once breached, the ceramic disk can no longer hold pressure in the wellbore. Embodiments disclosed herein feature hydrofluoric acid (HF) or hydrochloric acid (HCl) as the strong acid. Some embodiments disclosed herein utilize fluoroboric acid. The systems and methods used herein allow for the continued used of the acid as a stimulating agent for matrix stimulation and the reduction of the reservoir skin factor, thus resulting in a dual benefit of simultaneously stimulating a reservoir and preparing the wellbore for production with a singular tool run or charge.

Therefore, disclosed is a method of breaching a ceramic disk in a wellbore operable to maintain pressure within the wellbore during a wellbore procedure and stimulating a hydrocarbon reservoir for production behind the ceramic disk in a single downhole operation. The method includes the steps of injecting a strong acid into the wellbore in the single downhole operation, and dissolving the ceramic disk with the strong acid such that the ceramic disk can no longer maintain pressure within the wellbore. The strong acid is operable to both dissolve the ceramic disk and stimulate the hydrocarbon reservoir. The method also includes the steps of propelling the strong acid from the single wellbore operation within the wellbore to a target formation within the hydrocarbon reservoir, and contacting the target formation with the strong acid such that the strong acid stimulates the hydrocarbon reservoir by reducing a reservoir skin factor. The reduction of the reservoir skin factor results in improved hydrocarbon production.

In some embodiments, the strong acid includes hydrofluoric acid (HF). In other embodiments, the strong acid includes hydrochloric acid (HCl). In some embodiments, the ceramic disk includes ceramic made from calcium carbonate. In other embodiments, the ceramic disk includes ceramic made from magnesium carbonate. In some embodiments, the target formation includes sandstone. In further embodiments, the target formation includes carbonate.

In some embodiments, the method further includes the step of lowering coiled tubing into the wellbore, so that the step of injecting the strong acid into the wellbore is performed through the coiled tubing. In other embodiments, the strong acid is injected into the wellbore from a surface in the absence of the use of a downhole tool.

Further disclosed is a system for breaching the ceramic disk installed in a wellbore for a wellbore procedure and stimulating a hydrocarbon reservoir for production in a single downhole operation. The system includes the wellbore extending through the hydrocarbon reservoir and into a target formation. The target formation defines a reservoir skin factor. The system also includes the ceramic disk installed within the wellbore, where the ceramic disk operable to maintain pressure during the wellbore procedure. The system also includes a strong acid, where the strong acid is operable to dissolve the ceramic disk and reduce the reservoir skin factor of the target formation in the single downhole operation.

In some embodiments, the system also includes coiled tubing positioned within the wellbore, where the coiled tubing is operable to deliver the strong acid into the wellbore at a predetermined position. In some embodiments, the strong acid includes hydrofluoric acid (HF). In other embodiments, the strong acid includes hydrochloric acid (HCl). In some embodiments, the ceramic disk includes ceramic made from calcium carbonate. In other embodiments, the ceramic disk includes ceramic made from magnesium carbonate. In some embodiments, the target formation includes sandstone. In further embodiments, the target formation includes carbonate.

Further disclosed is a method of stimulating a hydrocarbon reservoir for production. The method includes the steps of drilling a wellbore in a target formation of the hydrocarbon reservoir, generating perforations in the wellbore in a target zone within the target formation, and installing a ceramic disk in the wellbore above the target zone. The ceramic disk is operable to maintain pressure within the wellbore during a wellbore procedure. The method also includes the steps of injecting a strong acid into the wellbore, and dissolving the ceramic disk with the strong acid such that the ceramic disk can no longer maintain pressure within the wellbore and therefore resulting in the flow of the strong acid to the target zone. The method includes the step of contacting the target formation with the strong acid through the perforations so that the strong acid stimulates the hydrocarbon reservoir by reducing a reservoir skin factor, where reducing the reservoir skin factor results in improved hydrocarbon production.

In some embodiments, the target formation includes sandstone. In further embodiments, the target formation includes carbonate.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the scope as it can admit to other equally effective embodiments.

FIG. 1A is a schematic of a vertical wellbore portion, according to an embodiment.

FIG. 1B is a schematic of a horizontal wellbore portion, according to an embodiment.

Figure 2:
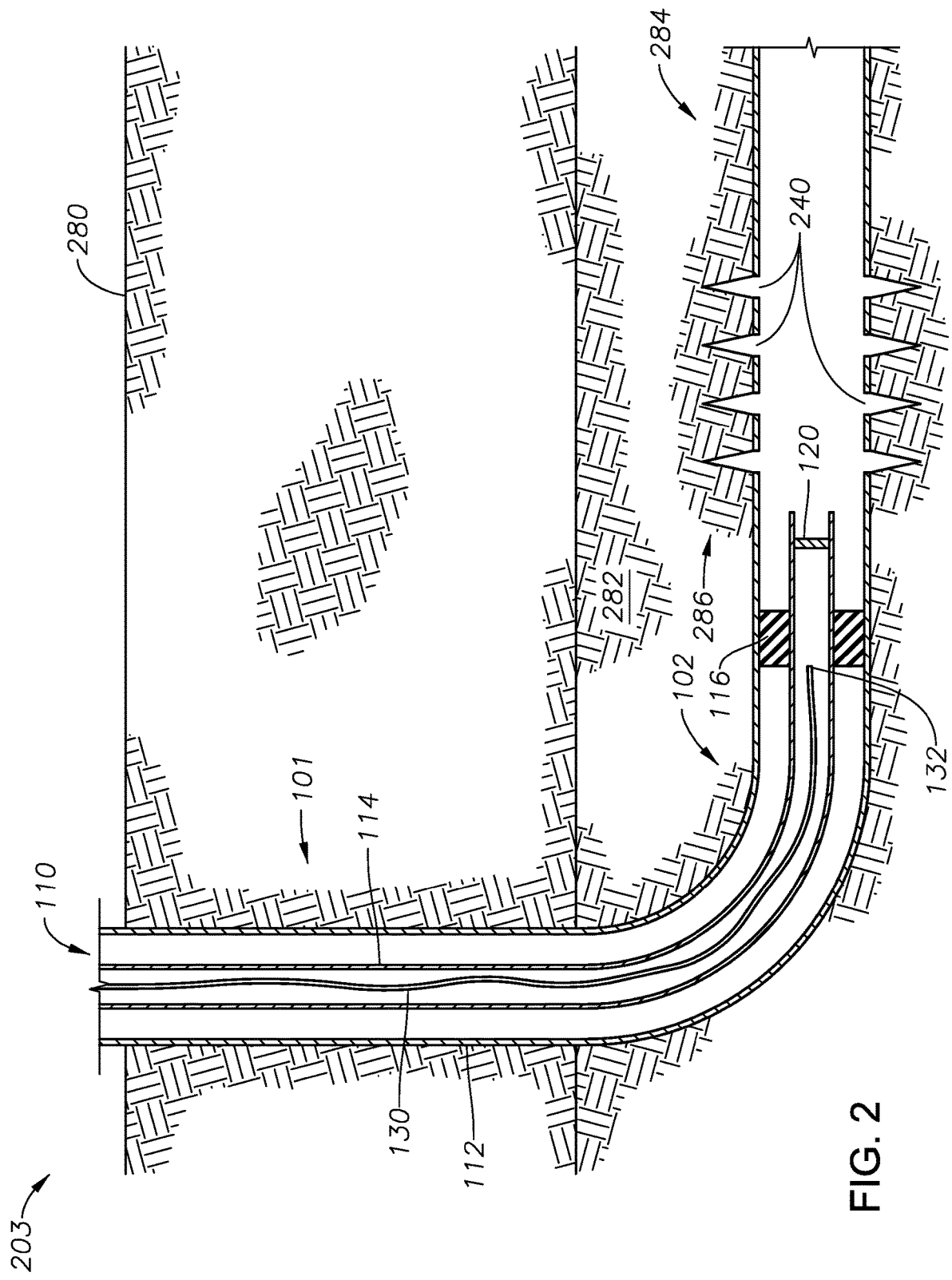
FIG. 2 is a cross-sectional schematic of a wellbore system with acid injection, according to an embodiment.

In the accompanying Figures, similar components or features, or both, can have a similar reference label. For the purpose of the simplified schematic illustrations and descriptions of FIGS. 1A through 2, the numerous pumps, valves, temperature and pressure sensors, electronic controllers, and the like that can be employed and well known to those of ordinary skill in the art are not included. Further, accompanying components that are in conventional industrial operations are not depicted. However, operational components, such as those described in the present disclosure, can be added to the embodiments described in this disclosure.

DETAILED DESCRIPTION

While the disclosure will be described with several embodiments, it is understood that one of ordinary skill in the relevant art will appreciate that many examples, variations and alterations to the systems and methods described are within the scope and spirit of the disclosure. Accordingly, the embodiments of the disclosure described are set forth without any loss of generality, and without imposing limitations, on the claims.

Advantageously, the present disclosure allows for multiple tasks—both preparation of the wellbore for production by removing a ceramic disk and stimulation of the formation below the ceramic disk—to be completed downhole with one method or system, resulting in substantial cost, time, and efficiency savings. Performing multiple tasks downhole also prevents potential complications from using multiple systems for the different tasks. Reducing the number of downhole tools and trips used is an important advantage as it reduces the chances of tools get stuck downhole, damage to the wellbore, or damage to the tools. Additional advantages of the present disclosure include a non-contact physical breaking of the ceramic disk, potential long-distance intervention and breaching of the ceramic disk, and elimination of heavy downhole milling tools. Since downhole milling tools require physical contact, they are more likely to experience problems downhole such as damage, interference from debris, or other mechanical failure than non-contact intervention such as the present system and method disclosed herein.

Referring to FIG. 1A, vertical wellbore portion 101 is depicted. Wellbore 110 includes production casing 112 and production tubing 114. Installed in the annulus between production casing 112 and production tubing 114 are packers 116. Optional nipple 152 is installed within production tubing 114. Nipple 152 can be a component of a drillstring, or a portion of a pipe in which a disk is installed either during pre-production piping installation or post-production piping installation. Nipple 152 is a completion component that provides a sealing area and optionally a locking profile. Nipple 152 can be a landing nipple, and can include a sealing area with a locking profile that locks ceramic disk 120 into place.

Installed within production tubing 114 is ceramic disk 120. Ceramic disk 120 can be installed by methods known in the art, including installation during production tubing installation. Ceramic disk 120 can be installed using conventional tools including wireline and slickline tools. Ceramic disk 120 can be installed before production tubing 114 is installed into wellbore 110. Ceramic disk 120 can be any type of disk capable of maintaining pressure in production tubing 114 while the wellbore procedure or other wellbore operations are being performed. The wellbore procedure can include the installation of packers 116. Ceramic disk 120 can withstand and maintain wellbore pressure from 10 psi to 10,000 psi, and wellbore temperatures from 50° F. to 250° F. In some embodiments, ceramic disk 120 is a primary pressure control, and back pressure valves (not shown) are also installed within production tubing 114 as a secondary pressure control. Ceramic disk 120 is capable of being dissolved by a strong acid. In some embodiments, ceramic disk 120 contains calcium carbonate. In some embodiments, ceramic disk 120 contains magnesium carbonate. In preferred embodiments, ceramic disk 120 is made of a homogenous material with no additional materials added, such that the entire disk dissolves in the acid with no additional solid components left behind in wellbore 110. Ceramic disk 120 is a curved, semi-sphere disk wedged or installed within production tubing 114 where the convex side faces the higher of the pressures within the wellbore; however, ceramic disk 120 can be any shape or size. In some embodiments, ceramic disk 120 is a flat, plate-like disk.

Coiled tubing 130 is deployed by lowering coiled tubing 130 into production tubing 114 towards ceramic disk 120. The lowering of coiled tubing 130 can be performed by method known in the art. Coiled tubing 130 is hollow on the inside, allowing material to be injected into the top of the tubing (not shown) and be delivered to wellbore 110 through delivery point 132. The exact depth of ceramic disk 120 in wellbore 110 or the exact depth coiled tubing 130 is lowered in wellbore 110, and therefore the location of delivery point 132, can be determined by methods known in the art, such as a case coil lock. A case coil lock is a downhole tool that can determine the depth downhole using a reference spot on the casing string, usually a magnetic anomaly measurement caused by the high molar mass of the casing string. In some embodiments, coiled tubing 130 is lowered into wellbore 110 so that the distance between delivery point 132 and ceramic disk 120 is less than about 750 feet, alternately less than about 600 feet, alternately less than about 500 feet, alternately less than about 400 feet, alternately less than about 300 feet, and alternately less than about 200 feet. In some embodiments, coiled tubing 130 is lowered into wellbore 110 so that the distance between delivery point 132 and ceramic disk 120 is in the range of about 100 to about 500 feet. In preferred embodiments, coiled tubing 130 is utilized in deep wells where ceramic disk 120 is installed beneath a certain distance. The depth of the ceramic disk can vary depending on the tubing length and the well trajectory. In some embodiments, ceramic disk 120 is installed within wellbore 110 several kilometers below the surface (not pictured).

Strong acid is injected into coiled tubing 130. Jetting tools (not pictured) can be used to direct the strong acid towards ceramic disk 120. The volume of strong acid utilized depends on the downhole size, production tubing 114 diameter, distance to ceramic disk 120, and other downhole factors, including stimulation needs. In some embodiments, ceramic disk 120 is not installed deep within production tubing 114, such that coiled tubing 130 is not necessary and the strong acid added to wellbore 110 is injected directly into production tubing 114 from the surface, such as through bullheading. In some embodiments, the strong acid is HCl. In some embodiments, the strong acid is fluoroboric acid ([H+][BF$_4$-]). Fluoroboric acid is advantageous where the formation is sensitive to HF, as it can avoid fines formation, destabilization, and pore plugging. Fluoroboric acid can also be advantageous when there is clay in the formation, and can remove carbonate cement in sandstone matrixes. Fluoroboric acid can be advantageous when the formation contains sandstone with potassic minerals as the reactions avoid creating damaging precipitates as it reaches the formation. In some embodiments, the strong acid is HF. When HF is used, the concentration of acid can be less than 3 mol %. The volume per foot of acid utilized can be in the range from 10 gal/ft to 50 gal/ft. In some embodiments, HCl is used for sandstone reservoirs or carbonate reservoirs. In some embodiments, HF is used for sandstone reservoirs. The strong acid contacts ceramic disk 120 which initiates a chemical reaction. Without being bound by theory, when HF is the strong acid, the chemical reaction proceeds as follows:

$$HF + XO \rightarrow H_2O + XF \qquad \text{Eq. 1}$$

XO can be any chemical compound bonded with an oxygen molecule, such as a carbonate molecule. In some embodiments, XO is a silicate, such as $SiO_4$, and those found in quartz, and the reaction generates Silicon tetrafluoride ($SiF_4$), a soluble gas. Without being bound by theory, when the ceramic disk contains calcium carbonate, the reaction with HF proceeds as follows:

$$CaCO_3 + 2HF \rightarrow CaF_2 + H_2O + CO_2 \qquad \text{Eq. 2}$$

Other reactions proceed as expected. In some embodiments, the ceramic disk consists primarily of $CaCO_3$, and the other substances contained within the disk that can react or not react with the strong acid and have little effect on the outcome of the process. After the chemical reaction begins, ceramic disk 120 can become weakened from components of ceramic disk 120 dissolving in the chemical reaction. After a predetermined amount of time, ceramic disk 120 is breached. The predetermined amount of time is a function of the temperature of the well and the strength of the acid. The higher the wellbore temperature, the faster the dissolution, as the rate of dissolution exponentially increases as the temperature rises. The strong acid can then continue through production tubing 114. In some embodiments, after ceramic disk 120 is broken, the strong acid can be pressurized, pushed, or otherwise propelled down production tubing 114 of wellbore 110 to a formation (not shown). In some embodiments, after ceramic disk 120 is broken, the well can be flowed back in preparation for production operations.

Referring to FIG. 1B, horizontal wellbore portion 102 is depicted, and shares many of the same elements and characteristics of vertical wellbore portion 101. Wellbore 110 contains horizontal wellbore portion 102. Disk sub 160 is installed in wellbore 110. Disk sub 160 is an optional component. Disk sub 160 can be a component of a drillstring, or can be incorporated directly within the piping in which a disk is installed either during pre-production piping installation or during post-production piping installation. Ceramic disk 120 is installed within disk sub 160, either before production tubing 114 is installed in wellbore 110 or after production tubing 114 is installed in wellbore 110.

Referring to FIG. 2, wellbore system with acid injection 203 is depicted, and shares many of the same elements and characteristics as vertical wellbore portion 101 and horizontal wellbore portion 102. Wellbore 110 extends from surface 280 and into hydrocarbon reservoir 282. In a preferred embodiment, wellbore 110 is a newly drilled well that has not been stimulated or re-worked previously. Hydrocarbon reservoir 282 can be an oil- or gas-containing reservoir. Vertical wellbore portion 101 extends into hydrocarbon reservoir 282, and horizontal wellbore portion 102 continues through hydrocarbon reservoir 282 and into target formation 284. Target formation 284 can be a portion of hydrocarbon reservoir 282 that requires or would benefit from stimulation. Perforations 240 are made in wellbore casing 112 at target zone 286. Perforations 240 can be made by any method known in the art, and include apertures, holes, and other openings which allow communication from target formation 284 into wellbore 110. Target zone 286 can be a targeted portion of target formation 284 requiring stimulation. In some embodiments, the stimulation is performed in an open wellbore where no casing or tubing has been installed in the target zone. In some embodiments, the stimulation is performed on a wellbore with casing and production tubing installed in the target zone, and perforations allow the acid to reach the rocks behind the casing and tubing. In some embodiments, the stimulation is performed after the well has begun production if the well is producing below expectations, so that the well may be prepared for production with the ceramic disk and acid stimulation an additional time to improve production.

As the strong acid travels through coiled tubing 130 out delivery point 132, the strong acid contacts ceramic disk 120. After ceramic disk 120 dissolves, the strong acid continues through production tubing 114 and through wellbore casing 112, nearing target zone 286. The strong acid contacts target formation 284 through perforations 240. As the strong acid contacts target formation 284, the strong acid reduces the skin factor. This reduces the skin damage of the reservoir, generating higher production. In some embodiments, the skin factor is reduced to negligible levels, alternately less than 0.1, and alternately less than 0.01.

The skin factor affects the shape of the pressure buildup data. Early deviations in the pressure buildup data from a straight line can be caused by skin factor as well as by wellbore storage. Positive skin factor can indicate a flow restriction, such as wellbore damage. Negative skin factor indicates stimulation of the wellbore and reservoir. Skin factor (S) can be calculated from the data available in the idealized pressure buildup test according to the following formula:

$$S = \left[\frac{k}{k_{skin}} - 1\right] \ln\left(\frac{r_{skin}}{r_w}\right) \quad \text{Eq. 3}$$

where s is the skin factor, which is unitless; k is the permeability of the formation in units of Darcy (D); $k_{skin}$ is the permeability of the reservoir skin in units of D; $r_{skin}$ is the radius of the reservoir skin in feet; and $r_w$ is the wellbore radius in feet.

As the skin factor is reduced, the productivity index (PI) will increase. The PI is a method of measuring the productivity of the well by dividing the flow rate in barrels (bbls) by the draw down (delta pressure). The higher the PI, the better the performance of the well. The productivity index will increase according to the following formula:

$$Q = \frac{kh}{\left(\ln\left(\frac{re}{rw}\right) - 0.75 + S\right)} \quad \text{Eq. 3}$$

where Q is the flow rate in bbl/day; k is the permeability in mD; h is the thickness of the reservoir in feet; re is the radius of the reservoir in feet; rw is the radius of the well in feet; and S is the skin factor, which is unitless.

Ranges may be expressed throughout as from about one particular value, or to about another particular value. When such a range is expressed, it is to be understood that another embodiment is from the one particular value or to the other particular value, along with all combinations within said range.

The singular forms "a," "an," and "the" include plural referents, unless the context clearly dictates otherwise.

As used in the specification and in the appended claims, the words "has," "contains," and "include" and all grammatical variations thereof are each intended to have an open, non-limiting meaning that does not exclude additional elements or steps.

What is claimed is:

1. A method of breaching a ceramic disk installed in a wellbore, wherein the ceramic disk maintains pressure within the wellbore during a wellbore procedure, and stimulating a hydrocarbon reservoir for production downhole of the ceramic disk in a single downhole operation, the method comprising the steps of:
   injecting a strong acid comprising fluoroboric acid into the wellbore in the single downhole operation, the strong acid operable to both dissolve the ceramic disk and stimulate the hydrocarbon reservoir;
   dissolving the ceramic disk with the strong acid such that the ceramic disk no longer maintains the pressure within the wellbore and the ceramic disk is breached;
   propelling the strong acid in the single downhole operation within the wellbore to a target formation within the hydrocarbon reservoir; and
   contacting the target formation with the strong acid such that the strong acid stimulates the hydrocarbon reservoir by reducing a reservoir skin factor, wherein reducing the reservoir skin factor results in improved hydrocarbon production.

2. The method of claim 1, wherein the ceramic disk comprises ceramic made from calcium carbonate.

3. The method of claim 1, wherein the ceramic disk comprises ceramic made from magnesium carbonate.

4. The method of claim 1, wherein the target formation comprises sandstone.

5. The method of claim 1, wherein the target formation comprises carbonate.

6. The method of claim 1, further comprising the step of lowering coiled tubing into the wellbore, such that the step of injecting the strong acid into the wellbore is performed through the coiled tubing.

7. A method of stimulating a hydrocarbon reservoir for production, the method comprising the steps of:
   drilling a wellbore in a target formation of the hydrocarbon reservoir;
   generating perforations in the wellbore in a target zone within the target formation;
   installing a ceramic disk in the wellbore above the target zone, the ceramic disk maintaining pressure within the wellbore during a wellbore procedure;
   injecting a strong acid comprising fluoroboric acid into the wellbore in a single downhole operation;
   dissolving the ceramic disk with the strong acid such that the ceramic disk no longer maintains the pressure within the wellbore, and resulting in a flow of the strong acid to the target zone in the single downhole operation; and
   contacting the target formation with the flow of the strong acid through the perforations such that the strong acid stimulates the hydrocarbon reservoir by reducing a reservoir skin factor, wherein reducing the reservoir skin factor results in improved hydrocarbon production.

8. The method of claim 7, wherein the target formation comprises sandstone.

9. The method of claim 7, wherein the target formation comprises carbonate.

* * * * *